United States Patent
Eden et al.

(10) Patent No.: US 6,171,483 B1
(45) Date of Patent: Jan. 9, 2001

(54) SUBSEA RAW WATER INJECTION FACILITY

(75) Inventors: Robert David Eden, Warrington (GB); Budiono Kurniawan Saputra, Bandung (ID); Anthony Robert Cousins, London (GB)

(73) Assignees: Capcis Limited, Manchester; McDermott Marine Construction Limited, Middlesex, both of (GB)

(*) Notice: Under 35 U.S.C. 154(b), the term of this patent shall be extended for 0 days.

(21) Appl. No.: 09/125,310
(22) PCT Filed: Feb. 13, 1997
(86) PCT No.: PCT/GB97/00399
§ 371 Date: Oct. 22, 1998
§ 102(e) Date: Oct. 22, 1998
(87) PCT Pub. No.: WO97/30268
PCT Pub. Date: Aug. 21, 1997

(30) Foreign Application Priority Data

Feb. 14, 1996 (GB) .................................................. 9603067

(51) Int. Cl.[7] .................................................. B01D 21/00
(52) U.S. Cl. .................... 210/170; 210/258; 210/305; 210/312; 210/521; 210/532.1
(58) Field of Search ..................... 210/170, 258, 210/259, 299, 305, 312, 521, 522, 532.1, 540

(56) References Cited

U.S. PATENT DOCUMENTS

| 167,546 | * | 9/1875 | Lefferts | 210/170 |
| 616,364 | * | 12/1898 | Shreeve | 210/170 |
| 3,399,135 | * | 8/1968 | Conley, Jr. et al. | 210/521 |
| 3,893,918 | * | 7/1975 | Favret, Jr. et al. | 210/170 |
| 3,903,000 | * | 9/1975 | Miura et al. | 210/521 |
| 3,996,138 | * | 12/1976 | Daidola et al. | 210/170 |
| 4,054,529 | * | 10/1977 | Pielkenrood | 210/521 |
| 4,122,017 | | 10/1978 | Tanabe et al. . | |
| 4,198,300 | * | 4/1980 | Williams | 210/170 |
| 4,238,335 | | 12/1980 | Grimsley . | |
| 4,305,819 | | 12/1981 | Kobozev et al. . | |
| 4,346,005 | * | 8/1982 | Zimmerman | 210/521 |
| 5,032,273 | * | 7/1991 | Senyard, Sr. et al. | 210/521 |
| 5,584,993 | * | 12/1996 | Van der Schrieck | 210/170 |

FOREIGN PATENT DOCUMENTS

| 0201263 | 11/1986 | (EP) . |
| 0423964 | 4/1991 | (EP) . |
| 1535591 | 12/1978 | (GB) . |
| 94/29222 | * 12/1994 | (WO) . |

OTHER PUBLICATIONS

Matthews, et al., 16th Annual offshore Technology Conference May 7–9 1984, Houston, Texas, USA, pp. 121–128, "Evaluation of Seawater Filtration Systems for North Sea Application,".

* cited by examiner

Primary Examiner—Christopher Upton
(74) Attorney, Agent, or Firm—Hogan & Hartson, LLP

(57) ABSTRACT

A subsea raw water injector including a pump which is connected to an injection string and a filter connected to an inlet of the pump to remove particulates from the surrounding sea water. The filter is in the form of an inclined tube settler disposed such that particulates separated from sea water flowing through it are discharged to the seabed.

11 Claims, 2 Drawing Sheets

SUBSEA RAW WATER INJECTION FACILITY

BACKGROUND OF THE INVENTION

1. Field of the Invention

The present invention relates to a subsea raw water injection facility for injecting sea water into an oil bearing formation.

There is a demand for new techniques to reduce the cost of exploration and production activity in off-shore oil fields such as the North Sea. As oil is discovered in ever deeper water, the costs of and risks associated with fixed platforms supporting production equipment increase. Thus anything which can be done to reduce the amount of equipment that has to be supported above the surface of the sea is useful.

2. Discussion of the Related Art

It is conventional practice to inject sea water into subsea oil bearing formations to assist with the process of sweeping oil from the formation and maintaining the pressure of the formation. Generally an oil production platform is provided with a processing plant to which sea water gathered from close to the sea surface is delivered. The processing plant typically comprises in series a coarse filter in the form of a screen, a fine filter, typically a body of sand, a chlorination unit, an oxygen scavenging unit and a de-oxygenation unit. The water is chlorinated to avoid biological activity and de-aerated to prevent rapid corrosion of pipes used to deliver processed water to an injection string leading to the subsea formation. The various sea water processing units are heavy and bulky and therefore supporting them above the surface of the sea is a significant problem, particularly in deep water.

International Patent Specification No. WO 94/29222 describes a sea water injection system in which the relevant processing units are mounted on the seabed. In the described system, a pump connected to an injection string is located within an enclosure the walls of which are porous. The pump is energized to draw sea water through the porous wall and appropriate arrangements are made to chlorinate the water as it passes through the wall. Particulates separated from the sea water passing through the wall will build up on the outside of that wall but it is believed that turbulence within the sea water will be sufficient to prevent the filter defined by the wall from being blinded.

The arrangement described in the published patent specification has its attractions in terms of simplicity but the concentration of particulates in sea water adjacent the seabed will be sufficiently high during periods of turbulence to make it difficult to predict the performance of the filter. Given the cost implications of an installed system failing there is a preference for using tried and test filtration systems which have a positive mechanism for discharging particulates separated from the pumped sea water.

A filter system is available which efficiently separates both mineral particulates such as sand and organic particulates which have neutral buoyancy. The known system incorporates an ejection mechanism which is periodically actuated so as to discharge separated particulates from the system. The use of such a system in the seabed environment is considered to be acceptable in terms of performance, but there is great concern about the long term viability of the particulate ejection system given that it is expected that large quantities of particulates will be separated and therefore the ejection system will have to be operated at regular intervals, for example many times each day.

SUMMARY OF THE PREFERRED EMBODIMENTS

It is an object of the present invention to provide a subsea injector system incorporating a filter which obviates or mitigates the problems outlined above.

According to the present invention, there is provided a subsea raw water injection facility comprising a pump which in use is positioned on the seabed and connected to an injector string of an oil bearing formation, and a filter connected to an inlet of the pump, the filter being open to the sea and being arranged to remove particulates from sea water drawn through it by the pump, wherein the filter comprises an inclined tube settler disposed such that particulates separated from sea water flowing through it are discharged to the seabed.

A large array of individual settling tubes can be supported on an assembly also incorporating the pump and ancillary filtration equipment designed to removed particulates of neutral buoyancy. The flow rate through each tube can be sufficiently low to ensure a very high percentage of mineral particulates are discharged from the tube and therefore do not contribute to the load on the ancilliary filtration equipment which is primarily provided to remove neutral buoyancy particulates.

Inclined tube settlers are well known, having been first introduced in the 1940s. They are used in for example water treatment plants to separate coagulated/flocculated material from processed water. In the known tube settlers, separated particulates are delivered to a discharge mechanism. In the subsea environment, such a discharge mechanism would carry with it the potential problems referred to above with regard to the available filtration and discharge mechanisms. The present invention is based firstly on the realization that tube settlers are well suited to separating out the highly variable concentrations of mineral particulates which occur in sea water adjacent the seabed, and secondly on the realization that, providing the tubes are appropriately positioned, separated particulates can be allowed to accumulate beneath the tubes until turbulent conditions arise which result in the dispersal of those particulates. Simply by ensuring that the seawater inlet/particulate discharge ends of the tubes are at a sufficient height above the seabed to prevent those ends becoming buried in accumulating sand ensures reliable continuous operation.

Preferably the tubes of the tube settler are formed from an array of superimposed corrugated sheets with the corrugations of adjacent sheets offset and secured together.

The injection facility may comprise a frame which supports the pump and defines a cover to protect the facility against dropped objects, the tube settler being in the form of arrays of tubes distributed beneath the edges of the cover.

The downstream ends of the tubes may be connected to a manifold which is connected to the pump inlet, means being provided to deter marine life from entering the manifold. Marine life may be deterred by chlorinating water within the manifold. The slow current flow through each tube avoids the irreversible ingestion of marine animals capable of swimming against that current and out of the facility through the seawater inlet/particulate discharge end of the tube. A simple device such as a net may be disposed across the upstream ends of the tubes to prevent the entry of all but small marine animals. In addition or as an alternative the tubes may be vibrated, for example by coupling the tubes to a vibrating component such as the pump. Such vibration assists in the self-cleaning of particulates from the tubes.

Preferably an ancillary filter is provided between the pump and the tube settler to remove neutral buoyancy particulates, the ancillary filter being provided with means for periodically discharging accumulations of particulates to the surrounding sea water.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 1:
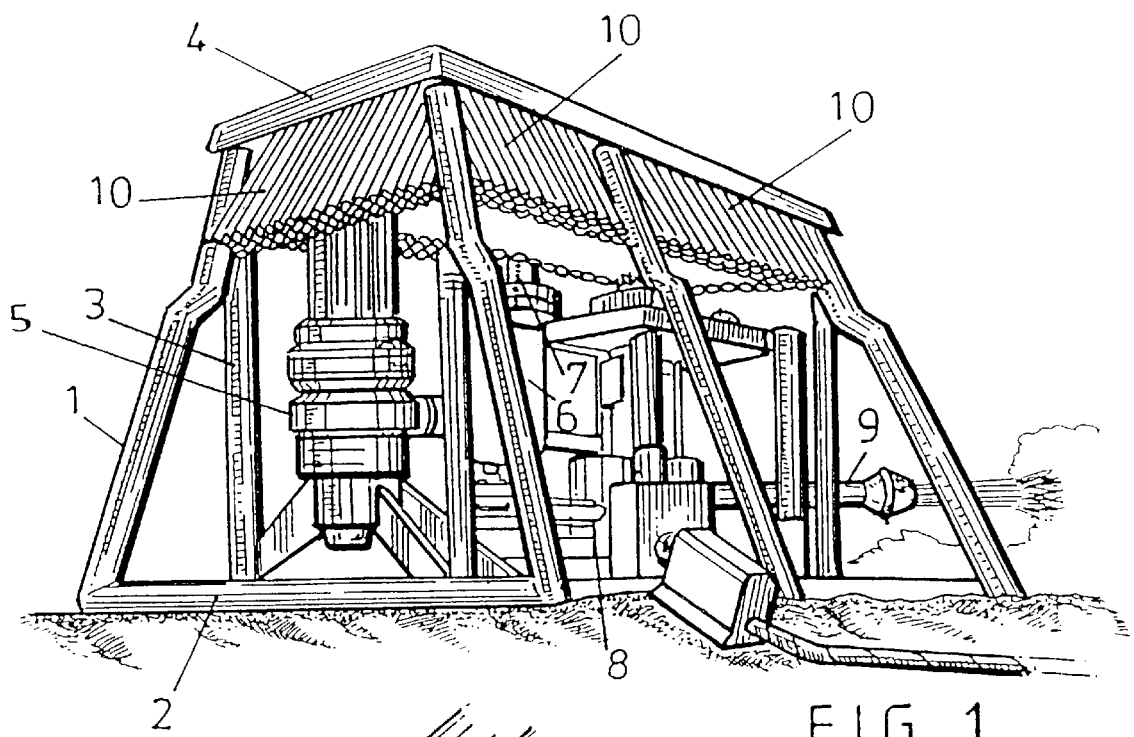
FIG. 1 is schematic perspective view of a subsea injection facility in accordance with the invention.

Referring to FIG. 1, the illustrated structure comprises a tubular frame defining outwardly splayed legs 1, a rectangular base 2 and vertical legs 3. The legs are connected to the underside of a cover 4 which serves to protect the assembly from dropped objects.

The frame supports a pump 5 an inlet which is connected to an inlet strainer 6 which in turn has an inlet 7 coupled to a manifold (not shown) beneath the cover 4. The strainer 6 is adapted to remove neutral buoyancy particulates from sea water flowing through it, the particulates being periodically removed by a discharge device 8 through an outlet nozzle 9. The manifold beneath the cover 4 is connected to the downstream ends of a tube settler defined by six arrays of tubes 10 disposed beneath the edges of the cover 4.

The tube settler removes a large proportion of the mineral particulates which may be in the sea water within which the injection facility is immersed. Neutral buoyancy particles will of course pass unimpeded through the tube settler but these will be removed by the strainer 6 and periodically discharged through nozzle 9. As a result the life expectancy of the strainer and the associated ejection equipment will be greatly enhanced as compared with a system in which no tube settler was provided.

Figure 2:
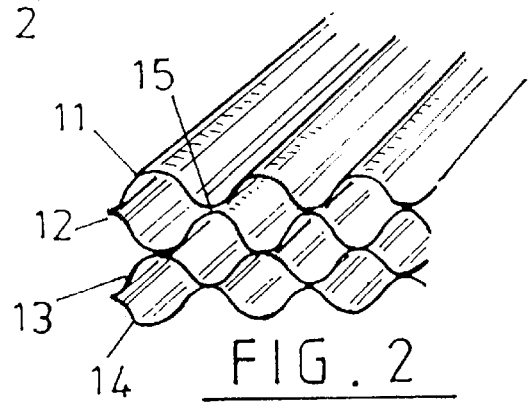
FIG. 2 is a schematic representation of part of one of the tube settlers incorporated in the embodiment of FIG. 1.

The arrays of tubes may be manufactured in any appropriate manner. Tests have shown however that a particularly efficient performance can be obtained using a settler fabricated as illustrated in FIG. 2. As shown in FIG. 2 the corrugated sheets 11, 12, 13 and 14 are stacked one from the other with the corrugations offset and welded together, one of the welds being located for example at the point indicated by numeral 15. The corrugations may be of any suitable geometric shape, for example corresponding to a sine wave, the objective being to maximize the width of each tube whilst minimizing the height and maximizing the number of tubes packed within a unit volume and yet retaining an acceptable flow cross-section. The assembly of tube arrays from superimposed corrugated sheets results in a very robust and yet easy to manufacture structure.

Figure 3:
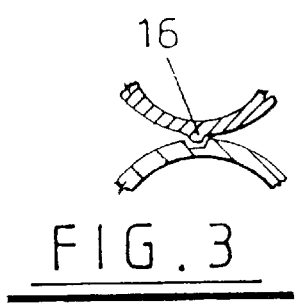
FIGS. 3 and 4 illustrate alternative arrangements for interconnecting components of the settler of FIG. 2.
Figure 4:
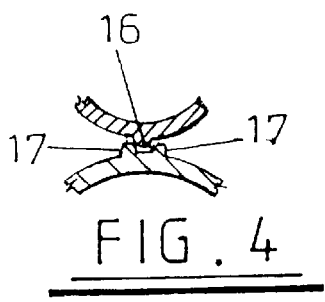

As shown in FIG. 3, the interconnection between adjacent corrugations can be effected by welding a projection 16 formed on one corrugated sheet within a groove formed in the adjacent corrugated sheet. As an alternative to the arrangement of FIG. 3, the projection 16 on one sheet could be received in a groove defined between two spaced apart projections 17 on the adjacent sheet as shown in FIG. 4.

Figure 5:
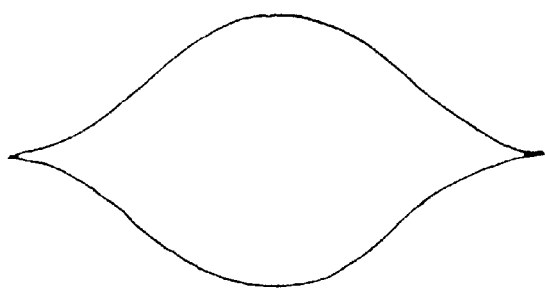
FIG. 5 is a cross-section of a tube used to test the efficiency of a settler having a shape as shown in FIG. 2.

FIG. 5 shows a cross-section of a tube formed from interconnecting two strips of material cut from a sheet of corrugated plastics, each strip having a width corresponding to one "waveuegth" of a generally sine-wave shape. Each corrugation has a peak to peak amplitude of 1.8 cm and a wavelength of 7.5 cm such that the width of the tube is 7.5 cm and its depth is 3.6 cm. With this configuration a relatively restricted rapidly tapering portion is formed at each side of the tube and this could conceivably cause a problem if particles were to build up in this area, but this problem could be overcome for example by adopting the configuration of FIG. 4. All the tests referred to below were however conducted on the basis of a structure as illustrated in FIG. 5.

Tests were conducted with tubes having cross-sections as shown in FIG. 5 and lengths of 1.0 m and 1.8 m. The tubes were inclined at 45° to the horizontal and were operated at various flow rates. The tubes were tested to determine their performance in separating out silica sand and Accrington Blue particles with a size range of from 63 to 90 and from 90 to $106 \times 10^{-6}$ meters respectively. Water was circulated through the tubes, the water having a solids concentration of 5.0 grams per liter and being vigorously agitated.

Tests were also conducted with tubes of circular cross-section having an internal diameter of 4.3 cm. These were used to provide a basis for comparing the performance of conventional tubular settlers with those incorporating tubes as shown in FIG. 5.

Figure 6:
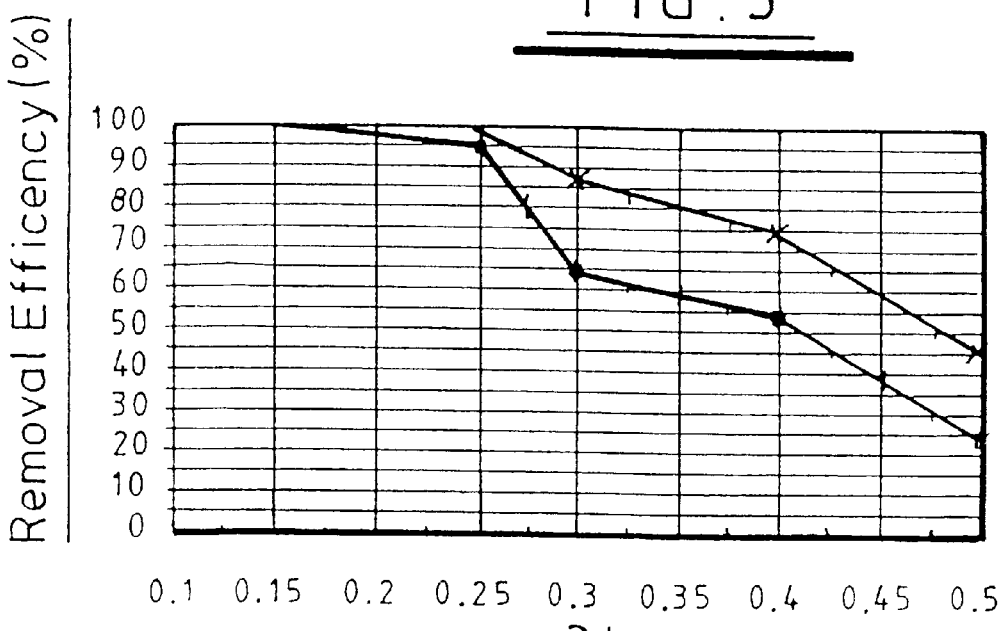
FIG. 6 is a graph comparing the performance of the tube of FIG. 5 with a tube of circular cross-section.

FIG. 6 plots removal efficiency against flow rate for the circular tube (lower curve) and the tube of FIG. 5 (upper curve), both tubes being 1 m long. These results show that removal efficiency falls significantly at flow rates above 0.25 $m^3$ per hour and falls much more rapidly at flow rates of between 0.25 and 0.3 $m^3$ per hour in the case of the tubular cross-section.

Figure 7:
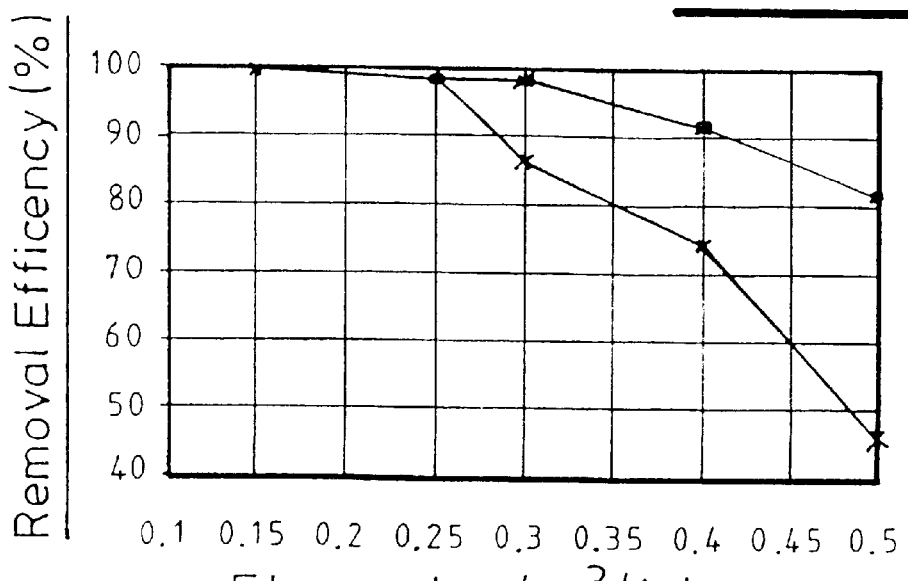
FIG. 7 is a graph illustrating the performance of the different lengths of the tube of FIG. 5.

It is believed that the superior performance of the tube according to FIG. 5 is due to the relatively larger ratio of wetted perimeter to the cross-section and settling area provided by the cross-section of FIG. 5 as compared with a circular cross-section. In particular, the tube as shown in FIG. 5 has a settling depth of only 3.6 cm whereas that of the circular section tube of equivalent cross-sectional area is 4.3 cm. A shorter settling depth reduces the settling time required and hence increases the tendency of particles which have slow settling velocities to settle FIG. 7 graphically represents the relative performance of two tubes both having the cross-section of FIG. 5 but one having a length of 1.0 m (lower curve) and the other having a length of 1.8 m (upper curve). These results clearly suggest that a longer tube significantly improves removal efficiency. It will be noted that for a tube having the cross-section of FIG. 5 and a length of 1.8 m, if the tube is operated at a flow rate of at most 0.40 $m^3$ per hour the removal efficiency is more than 90%.

Longer tubes not only provide a larger and longer settling area, they also overcome the problem associated with the alteration of particle trajectories due to increased flow rates. This was readily apparent by observation of the turbidity of water within the tube which was 1.8 m long, as the water appeared relatively turbid at a distance of 1 m from the tube inlet but was fairly clear approaching the tube outlet.

On the basis of the above results, a 200 $m^3$ per hour seabed filtration facility having a minimum removal efficiency of 90% would require 500 tubes having a cross-section as shown in FIG. 5 and a length of 1.8 m. A removal efficiency of 99% could be achieved with 1000 tubes. It may be advisable to provide a baffle or screening arrangement adjacent the tube inlet to equalize flows resulting from turbulence in the sea.

What is claimed is:

1. A subsea raw water injection facility comprising a pump positioned on a seabed and connected to an injector string of an oil bearing formation, and a filter positioned on the seabed and connected to an inlet of the pump, the filter being open to the sea and being arranged to remove particulates from sea water drawn through the filter by the pump, wherein the filter comprises an inclined tube settler disposed such that particulates separated from sea water drawn through the tube settler are discharged to the seabed.

2. An injection facility according to claim 1, wherein the tube settler comprises tubes formed from an array of superimposed corrugated sheets, wherein the corrugations of adjacent sheets are offset and connected together.

3. An injection facility according to claim 2, wherein downstream ends of the tubes are connected to a manifold connected to the inlet of the pump, and further comprising means to deter marine life from entering the manifold.

4. An injection facility according to claim 3, wherein the means to deter marine life from entering the manifold comprises means to chlorinate water within the manifold.

5. An injection facility according to claim 2, further comprising a net for obstruction access by marine life to upstream ends of the tubes.

6. An injection facility according to claim 1 or 2, wherein the pump and tube settler are supported on a frame including a cover to protect the facility against dropped objects, the tube settler comprising arrays of tubes distributed beneath edges of the cover.

7. An injection facility according to claim 1 or 2, further comprising means for vibrating the tube settler.

8. An injection facility according to claim 1 or 2, further comprising an auxiliary filter connected between the pump inlet and tube settler, the auxiliary filter being arranged to remove neutral buoyancy particulates and including means for periodically discharging accumulations of particulates.

9. An injection facility according to claim 1, further comprising a net for obstructing access by marine life to upstream ends of the tube settler.

10. An injection facility according to claim 1, wherein downstream ends of the tube settler are connected to a manifold connected to the inlet of the pump, and further comprising means to deter marine life from entering the manifold.

11. An injection facility according to claim 10, wherein the means to deter marine life from entering the manifold comprises means to chlorinate water within the manifold.

* * * * *